Patented Nov. 11, 1952

2,617,780

UNITED STATES PATENT OFFICE 2,617,780

COATING COMPOSITIONS CONTAINING A SYNTHETIC RESIN AND A LIQUID PROPELLANT

Raymond H. Lutz, Wilton, Conn.

No Drawing. Application September 30, 1948, Serial No. 52,133

1 Claim. (Cl. 260—33.8)

The present invention relates to a coating composition and method of making and applying the same, and more particularly a plastic coating material of the type having a synthetic resinous base, and which is adapted to be applied in the form of a thin transparent coat to paper, fabric, wood, metal, glass and other materials for the purpose of waterproofing and preserving the surface of such materials. It will be understood that such material is not limited to these uses, and that, instead of a synthetic resinous base, it may have a natural resinous base, and may have coloring and other materials added thereto, as long as such coating material combines effectually with the other materials contemplated in the invention for the purpose of carrying out the purposes of the invention.

It is proposed according to the invention to combine with the basic synthetic resinous material, or other suitable coating material, a propellant constituting a solvent for the coating material, such propellant being a volatile substance of the type commercially known as "Freon" which propels and atomizes the coating material, so that it not only forms a superficial coating but effectually penetrates and seals the coated surface. This action results, at least in part, from the peculiar characteristic of the volatile propellant employed, which when released at ordinary atmospheric or room temperatures evaporates with explosive violence in such a way that the dissolved materials are divided into minute particles and thus form a closely adhesive and penetrating coating of extreme homogeneity.

Heretofore coating materials of the synthetic resinous type have ordinarily been brushed on or applied by spray gun equipment requiring a source of air pressure. These methods have not only proved inconvenient and cumbersome, but have been incapable of producing a coating of extreme thinness and uniformity and which effectually seals the surface in the manner accomplished by the invention. The extreme rapidity with which coating material of this type solidifies in contact with air causes brush marks to appear in the coated surface. Also the apparatus employed with previous spraying methods could not easily be manipulated with one hand, thus making it impossible to effectually coat an article held in one hand while the spraying apparatus was manipulated with the other hand. Such materials also tended to clog the passages of the containers, and had a deteriorating effect upon the containers causing them to oxidize and rust.

It has been found that the material of the invention including the volatile propellant of the "Freon" type prevents clogging of the propellant in the container, and also resists or eliminates the tendency to cause oxidizing or rusting of the material of the container. Another important advantage of the material of the invention including the volatile propellant of the "Freon" type is that coating materials which under ordinary circumstances are inflammable are rendered substantially non-inflammable by the combination therewith of "Freon," and it has been found that sufficient residual material remains in the coating after it is applied, or a chemical change is produced therein due to the combining therewith of the volatile propellant, that the non-inflammable characteristic remains in the coating.

Another object of the invention is to provide a self-contained portable unit for the spraying of synthetic resinous or other coating material.

An example of suitable coating material that may be employed in the composition according to the invention is material having a synthetic resinous base, such, for instance, as methyl acrylate polymer, and this may include a solvent, such as toluene chlorinated, the latter being a solvent such as is used for thinning paint. Another example of a suitable coating material is clear cellulose such as polystryrene lacquer.

The volatile propellant employed is a suitable substance constituting a solvent for the coating material and which has a low boiling point that causes the propellant to change from a liquid to a gaseous state when released into the atmosphere from a confined space. The preferred material of the invention is the material commercially known as "Freon," and in the preferred composition of the invention a mixture of "Freon 12" and "Freon 11" is employed. "Freon 12" is dichlorodifluoromethane ($CCl_2F_2$) and has a boiling point of —29.8° C. "Freon 11" is trichloromonofluoromethane ($CCl_3F$) and has a boiling point of —23.7° C. A suitable composition according to the invention consists of the following ingredients:

Basic coating material, for instance, methyl acrylate polymer and a suitable solvent, for instance, toluene chlorinated 20% by weight, "Freon 12" 48% by weight, "Freon 11" 32% by weight.

The preferred method of preparing the composition is to combine the materials under suitable low temperatures below the boiling point of the propellant so that the propellant is liquid, and in this state to confine the combined liquid in suitable sealed containers. For commercial use these containers may be of any suitable size as, for instance 4 oz. or 12 oz. containers which may be conveniently held in the hand, and these are provided with a valve having a small outlet orifice so that upon opening the valve the material is released and expanded. The sprayed material is released directionally so that its application to the surface to be coated may be accurately controlled. Drying of the sprayed coating takes place very rapidly in a matter of seconds.

While the invention has been described in detail with specific examples, such examples are illustrative, and are not given as limitations, since other modifications within the spirit and scope of the invention will be apparent to those skilled in the art.

What I claim is:

A coating composition capable of being applied in the form of a thin transparent coating to a surface to be coated, which comprises, methyl acrylate polymer dissolved in a solvent consisting of a mixture of chlorinated toluene 20% by weight, dichlorodifluoromethane 48% by weight, and trichloromonofluoromethane 32% by weight, said composition being maintained under pressure and in a confined space.

RAYMOND H. LUTZ.

REFERENCES CITED

The following references are of record in the file of this patent:

UNITED STATES PATENTS

| Number | Name | Date |
| --- | --- | --- |
| 1,945,998 | Rotheim | Feb. 6, 1934 |
| 2,316,197 | Tucker | Apr. 13, 1943 |
| 2,321,023 | Goodhue et al. | June 8, 1943 |
| 2,407,668 | Leatherman | Sept. 17, 1946 |
| 2,440,915 | Roehr | May 4, 1948 |

FOREIGN PATENTS

| Number | Country | Date |
| --- | --- | --- |
| 811,418 | France | Jan. 14, 1937 |